US012704939B2

(12) United States Patent
Ashok et al.

(10) Patent No.: US 12,704,939 B2
(45) Date of Patent: Aug. 11, 2026

(54) DYNAMICALLY PROVIDING A MACRO TO A USER BASED ON PREVIOUS USER INTERACTIONS

(71) Applicant: GOOGLE LLC, Mountain View, CA (US)

(72) Inventors: Sneha Ashok, San Jose, CA (US); Cliff Kuang, San Francisco, CA (US); Mugurel-Ionut Andreica, Adliswil (CH)

(73) Assignee: GOOGLE LLC, Mountain View, CA (US)

( * ) Notice: Subject to any disclaimer, the term of this patent is extended or adjusted under 35 U.S.C. 154(b) by 42 days.

(21) Appl. No.: 18/230,564

(22) Filed: Aug. 4, 2023

(65) Prior Publication Data

US 2025/0044913 A1 Feb. 6, 2025

(51) Int. Cl.

| | |
|---|---|
| ***G06F 9/451*** | (2018.01) |
| ***G06F 3/0482*** | (2013.01) |
| ***G06F 3/0488*** | (2022.01) |
| ***G06F 11/34*** | (2006.01) |

(52) U.S. Cl.

CPC .......... *G06F 3/0482* (2013.01); *G06F 3/0488* (2013.01); *G06F 9/453* (2018.02); *G06F 11/3438* (2013.01)

(58) Field of Classification Search

None

See application file for complete search history.

(56) References Cited

U.S. PATENT DOCUMENTS 5,018,082 A * 5/1991 Obata ..................... G06F 9/453 434/335
5,235,679 A * 8/1993 Yoshizawa .......... G06F 3/04895 715/810
5,822,123 A * 10/1998 Davis .................. H04N 21/472 348/E7.071
9,367,199 B2 * 6/2016 Klemenz ................ G06F 9/453
2004/0036718 A1 * 2/2004 Warren ................ G06F 16/904 715/744
2006/0170687 A1 * 8/2006 Nakamura .......... H04N 23/633 348/E5.038
2007/0157093 A1 * 7/2007 Karcher ................. G06F 9/453 715/707
2010/0205529 A1 * 8/2010 Butin ....................... G06F 8/38 715/704
2010/0205530 A1 8/2010 Butin
2010/0251118 A1 * 9/2010 Peterson ................ G06F 9/453 715/710

(Continued)

OTHER PUBLICATIONS

European Patent Office; International Search Report and Written Opinion issued in Application No. PCT/US2024/040857; 13 pages; dated Nov. 15, 2024.

*Primary Examiner* — Christopher J Fibbi
(74) *Attorney, Agent, or Firm* — Gray Ice Higdon

(57) ABSTRACT

Implementations relate to providing a macro to a user to instruct the user regarding how to perform an action. When a user submits a request to perform an action, an option is provided that indicates a macro is available. Upon selecting the macro, one or more elements are displayed, with a corresponding application displayed in the background. The next element is displayed after a period of time, depending on the user familiarity with the action.

18 Claims, 13 Drawing Sheets

(56) References Cited

U.S. PATENT DOCUMENTS

| | | | | |
|---|---|---|---|---|
| 2015/0301729 | A1* | 10/2015 | Wang | G06F 3/0485 715/707 |
| 2016/0291802 | A1* | 10/2016 | Beck | G06F 3/0481 |
| 2020/0327817 | A1* | 10/2020 | Raynaud | G10L 21/10 |
| 2021/0082420 | A1 | 3/2021 | Kraljic et al. | |

* cited by examiner

DYNAMICALLY PROVIDING A MACRO TO A USER BASED ON PREVIOUS USER INTERACTIONS

BACKGROUND

A significant number of tasks that are performed by users on mobile devices are repetitive and may be performed multiple times a day and/or may be performed by multiple users in the same or a similar manner. In some instances, the sequence of steps that comprise an action may be difficult for a user to remember, may be time-consuming for the user to perform as needed, and/or may otherwise hinder a user from utilizing a mobile device to its fullest benefit.

For some actions, a user may not know the full capabilities of a mobile device and may therefore perform some actions less optimally than how the action(s) could otherwise be performed. Further, some actions may require a user to access multiple applications, perform multiple steps in a particular order, and/or provide repetitive input in order to complete an action. Thus, user input can be prone to errors that can inhibit performance of a desired action.

In some instances, a routine may be executed by an automated assistant and/or an operating system to automatically perform one or more actions in lieu of the user performing the actions. However, some routines may require a user to provide feedback and/or additional information in order for one or more of the actions to be performed. Thus, although the routine is primarily executing without user input, some actions may require the user to be prompted so that an action can be performed and the next action initiated.

SUMMARY

Techniques are described herein for providing a macro to a user that demonstrates a sequence of actions that the user can perform to complete an action. The techniques described herein include receiving a request from a user to be provided a macro to perform an action, determining, based on past performances of the user, a user familiarity with the action, selecting a macro based on the user familiarity, and providing the macro to the user. When the user initiates performance of the macro, the macro demonstrates performance of the steps that are required to complete the requested action. Based on the selected macro, a playback speed can be determined accordingly such that a user that is more familiar with the action will be presented with the steps more rapidly than a user that is less familiar with the action.

As an example, a user may request to set a mobile device to a "do not disturb" setting (e.g., limited audio and/or haptic alerts). However, the user may not be familiar with where one or more selection interfaces are located and/or how to navigate to the correct interface to complete the task. Based on whether the user has requested how to perform the action previous, the user is provided with a macro. If the user has not previously requested to be provided with steps to set the mobile device to "do not disturb," the macro may initiate and demonstrate how to perform each step at a slower pace than, for example, a user that has requested to be provided the steps multiple times. In some instances, the user may be provided with a macro that includes a "next button" to allow the user to be provided with each step at their own pace.

In some implementations, a macro suggestion can be provided when a user searches on how to perform an action. For example, a user may search, via a search engine, "how do I silence my phone." In response, in addition to or in lieu of providing links to webpages that can answer the query of the user, the user may be provided a link to a macro to demonstrate how to perform the action. Also, for example, a link to a macro may be embedded in a webpage. In those instances, the user can select a link to navigate to the webpage and further select an indication of the macro to be provided with the macro.

In some implementations, when a macro is provided to the user, the macro can provide indications of steps that the user can perform to complete an action. The steps can include finger movements, selection of buttons, gestures, and/or other movements that the user can perform in order to complete an action. For example, a user may be required to make a sliding motion with a finger to access a menu. The macro may provide an icon that indicates to the user to "swipe" that is rendered at the location where the user should perform the motion. Also, for example, the macro may cause one or more buttons to be displayed more prominently than other UI components that are visible on the interface.

In some implementations, a macro may show one or more indications permanently on the interface while the macro is executing. Thus, for example, if a user zooms in on a particular location of an interface and/or moves a UI element, the macro will adjust to continue rendering the indication at the proper place (e.g., continue to highlight an icon that has been moved).

In some implementations, a macro may show one or more indications temporarily on an interface to allow the user to see the motion and/or step to initiate, and then allow the user to view the screen without the macro after a period of time. For example, a macro may highlight a button and then after five seconds, the highlighting may disappear, which can cause the interface to appear as it would without the macro executing. When the user performs a step correctly, the macros can continue to show the next step. In some implementations, if the user performs a step incorrectly, the macro may restore the indication of the step to the user to facilitate the correct step being taken by the user. In some implementations, a macro UI element may appear and disappear in a repeated cycle (e.g., "blink").

In some implementations, a step of a macro may include the user entering text into a text box and/or other UI element of an application. For example, a user may be accessing an application to order a ride share, and a step may include the user entering a location. In some implementations, the text box for entering the location may be displayed more prominently than other UI elements on the screen. In some implementations, the text box may be pre-filled with a value that may be of interest to the user. For example, in the instance of a ride sharing application, the macro may suggest a "home" address as a destination based on contextual information and/or user account information.

In some implementations, an action may include selecting two or more steps to continue the macro. For example, an application may allow a user to perform a first action or a second related action depending on selection of the user at a particular point during navigation of an application. As a specific example, a user may request a macro to change the display settings of a computer monitor. For a step, the user may have an option to change an orientation of the screen or to change the resolution of a screen, both options of which are displayed on the same screen of a "settings" interface. The user may be provided with a prompt to inquire regarding how the user would like to continue. The prompt may be, for example, a visual prompt (e.g., a dropdown menu or button overlays indicating the options) and/or an audible inquiry (e.g., an automated assistant inquiring "Would you like to do Action A or Action B").

In some implementations, a macro can proceed through the steps to perform an action at a pace that is dependent on previous interactions of the user. For example, a first user may select a macro for an action that the user has not previously performed. In that instance, the user may be provided with steps more slowly than another user that has performed the action multiple times. In some implementations, instead of automatically demonstrating a step and then demonstrating the next step after a period of time, the macro may provide a "next" button that the user can select to be provided with the next step of the action. Additionally and/or optionally, the user can be provided with a "back" button to allow the user to replay a previous step.

In some implementations, a user may perform a search (e.g., a web search via a search engine) and be provided with, in addition to web results, an interface element that allows the user to launch a macro. For example, a user may perform a web search of "how do I set my phone to do not disturb." In response, the search engine may provide one or more web results for websites that include instructions to perform the requested action. Additionally or alternatively, the search results can include an option to launch a macro. Also, for example, a web page that is accessed by a user can include a similar element that allows the user to launch a macro.

In some implementations, the user may be provided with an option to adjust the speed that a macro demonstrates steps. For example, a macro may be provided to the user such that steps are provided in five second intervals. The user may be provided with an interface element (e.g., a slide bar, a plurality of buttons) that allows the user to manually adjust the playback speed. Also, for example, the user may be provided with elements to allow the user to select between being provided with the next step automatically and being provided with a "next" button.

In some implementations, a macro can be generated that allows a user to be provided with specific steps for an application. For example, a user may be accessing an application that allows the user to play chess against a remote opponent and/or a computer opponent. The user may request (e.g., audibly and/or via an interface element) to be provided with the next move and/or a "best" move as a next step. In some implementations, the macro can include making the move for the user and/or illustrating, via an animation and/or static element, which move to make. The macro can communicate with the application via one or more APIs to facilitate identifying the current status of the chess board and determine a move utilizing one or more backend chess engines.

Techniques described herein reduce memory and resource consumption of one or more computing resources by mitigating the need for a user to repeatedly perform searches to determine how to perform an action. By providing a user with a macro to demonstrate how to perform an action, resources are conserved by reducing the number of search results that a user may be required to view before identifying instructions to perform an action. Further, by demonstrating how to perform an action as an overlay to an application, computing resources are conserved for subsequent interactions of the user by improving performance of the user when performing the desired action.

The above description is provided as an overview of some implementations of the present disclosure. Further description of those implementations, and other implementations, are described in more detail below.

DETAILED DESCRIPTION

Figure 1:
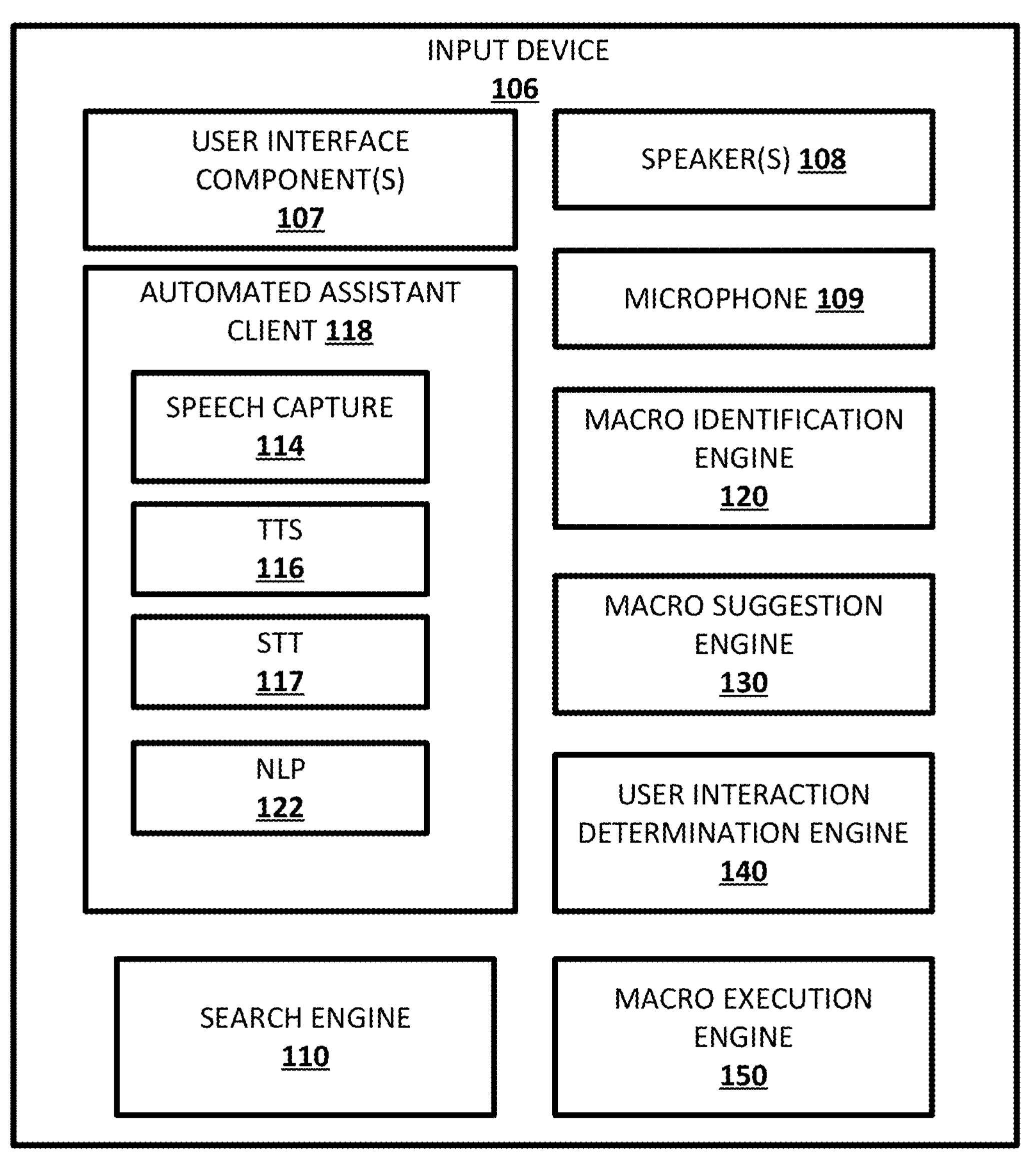
FIG. 1 is a block diagram of an example environment in which implementations disclosed herein can be implemented.

Turning now to FIG. 1, an example environment in which techniques disclosed herein can be implemented is illustrated. The example environment includes an input device 106. The input devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), an interactive standalone speaker (e.g., with or without a display), a smart appliance such as a smart television or smart washer/dryer, a wearable apparatus of the user that includes a computing device (e.g., a watch of the user having a computing device, glasses of the user having a computing device, a virtual or augmented reality computing device), and/or any IoT device capable of receiving user input directed to the automated. Additional and/or alternative input devices may be provided. In some implementations, the plurality of input devices 106 can be associated with each other in various ways in order to facilitate performance of techniques described herein. For example, in some implementations, the plurality of input devices 106 may be associated with each other by virtue of being communicatively coupled via one or more networks. This may be the case, for instance, where the plurality of input devices 106 are deployed across a particular area or environment, such as a home, a building, and so forth. Additionally, or alternatively, in some implementations, the plurality of input devices 106 may be associated with each other by virtue of them being members of a coordinated ecosystem that are at least selectively accessible by one or more users (e.g., an individual, a family, employees of an organization, other predefined groups, etc.). In some of those implementations, the ecosystem of the plurality of input devices 106 can be manually and/or automatically associated with each other in a device topology representation of the ecosystem.

Each of the input devices 106 further includes respective user interface component(s) 107, which can each include one or more user interface input devices (e.g., microphone, touchscreen, keyboard, and/or other input devices) and/or one or more user interface output devices (e.g., display, speaker, projector, and/or other output devices). As one example, user interface components 107 of input device 106 can include only speaker(s) 108 and microphone(s) 109, whereas user interface components 107 of another input device 106 can include speaker(s) 108, a touchscreen, and microphone(s) 109.

In various implementations, each of the input devices 106 may operate a respective automated assistant client 118. In various embodiments, each automated assistant client 118 may include a respective speech capture/text-to-speech (TTS)/speech-to-text (STT) module 114 (also referred to herein simply as "speech capture/TTS/STT module 114"). In other implementations, one or more aspects of the respective speech capture/TTS/STT module 114 may be implemented separately from the respective automated assistant client 118.

Each respective speech capture/TTS/STT module 114 may be configured to perform one or more functions including, for example: capture a user's speech (speech capture, e.g., via respective microphone(s) 109); convert that captured audio to text and/or to other representations or embeddings (STT) using speech recognition model(s) stored in a database; and/or convert text to speech (TTS) using speech synthesis model(s) stored in a database. Instance(s) of these model(s) may be stored locally at each of the respective input devices 106 and/or accessible by the input devices. In some implementations, because one or more of the input devices 106 may be relatively constrained in terms of computing resources (e.g., processor cycles, memory, battery, etc.), the respective speech capture/TTS/STT module 114 that is local to each of the input devices 106 may be configured to convert a finite number of different spoken phrases to text (or to other forms, such as lower dimensionality embeddings) using the speech recognition model(s). Other speech input may be sent to one or more of the cloud-based automated assistant components, which may include a cloud-based TTS module and/or a cloud-based STT module.

The NLP module 122 processes natural language input generated by users via the input devices 106 and may generate annotated output for use by one or more other components of the automated assistant, the input devices 106. For example, the NLP module 122 may process natural language free-form input that is generated by a user via one or more respective user interface input devices of the input devices 106. The annotated output generated based on processing the natural language free-form input may include one or more annotations of the natural language input and optionally one or more (e.g., all) of the terms of the natural language input.

In some implementations, the NLP module 122 is configured to identify and annotate various types of grammatical information in natural language input. For example, the NLP module 122 may include a part of speech tagger configured to annotate terms with their grammatical roles. In some implementations, the NLP module 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities.

The entity tagger of the NLP module 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the NLP module 122 may additionally and/or alternatively include a coreference resolver (not depicted) configured to group, or "cluster," references to the same entity based on one or more contextual cues. For example, the coreference resolver may be utilized to resolve the term "it" to "front door lock" in the natural language input "lock it", based on "front door lock" being mentioned in a client device notification rendered immediately prior to receiving the natural language input "lock it".

In some implementations, one or more components of the NLP module 122 may rely on annotations from one or more other components of the NLP module 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 122 may use related data outside of the particular natural language input to determine one or more annotations-such as an input device notification rendered immediately prior to receiving the natural language input on which the input device notification is based.

Input device 106 further includes search engine 110 that can receive input from a user (e.g., textual input and/or an utterance) and perform a web search to provide the user with documents (e.g., web pages) that are responsive to the search. Also, in some implementations, the search engine can provide one or more additional resources that are responsive to the search query.

Figure 2A:
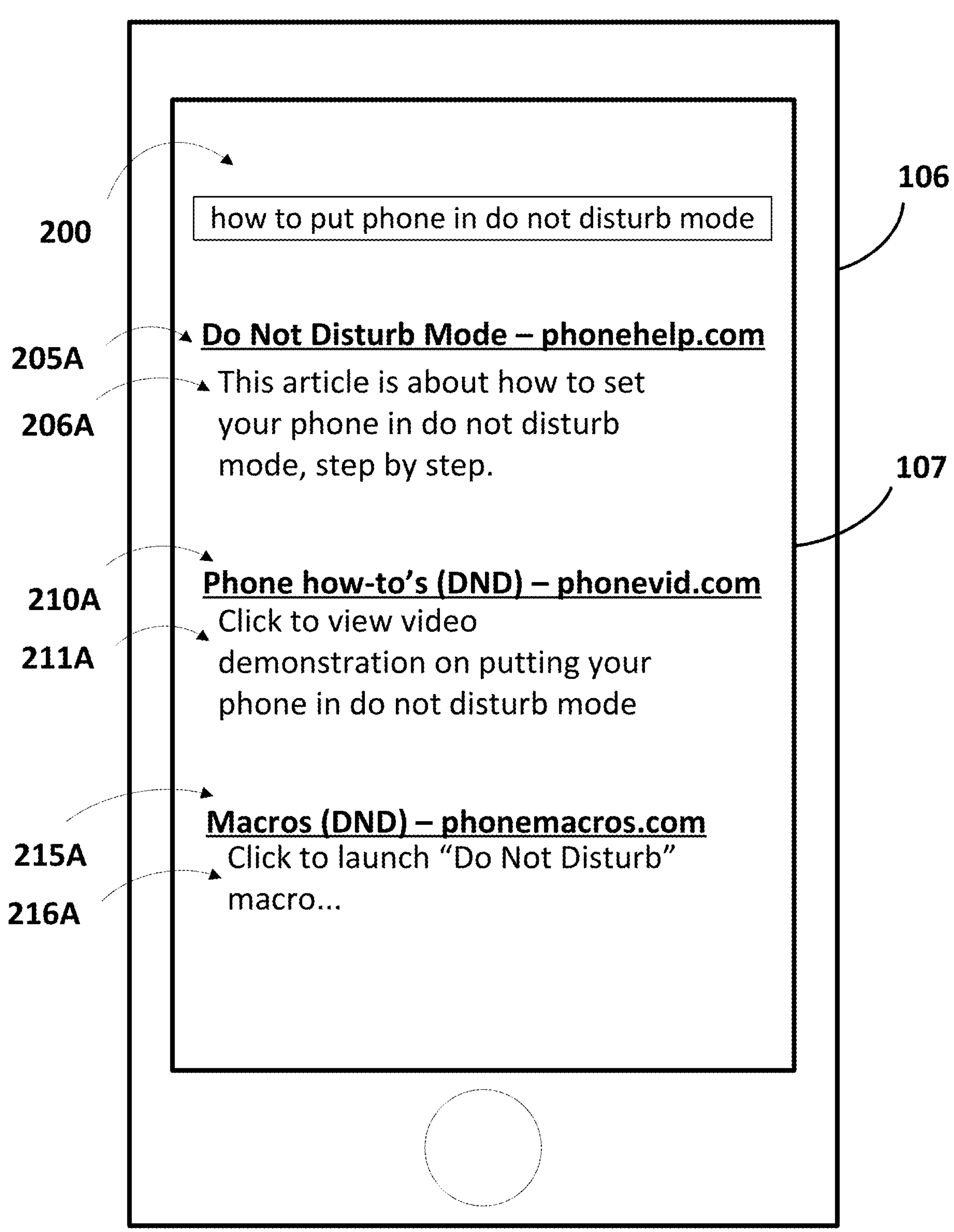
FIG. 2A and FIG. 2B depict example interfaces illustrating providing a macro to a user via a web page.

Referring to FIG. 2A, in some implementations, interface 107 can be utilized to provide a user with search results that are generated by search engine 110. For example, a user may be provided with a GUI via interface 107 that includes a form whereby the user can provide a search query. The search query can be provided to search engine 110, which can determine one or more search results that are responsive to the query. For example, referring again to FIG. 2A, an interface 107 is illustrated that includes three search results 205A, 210A, and 215A. The interface 107 further includes a snippet of the information included in a web document for each of the search results 205A, 210A, and 215A. For example, 206A includes information that is included on a first webpage (i.e., a "phonehelp.com" web document that includes the terms "This article is about . . . , etc.), snippet 211A includes information that is included on a second webpage (i.e., a "phonevid.com" web document that includes the terms "Click to view video . . . ," etc.), and snippet 216A includes information that is included on a third webpage (i.e., a "phonemacros.com" web document that includes the terms "Click to launch . . . ," etc.). In some implementations, search engine 110 may provide, in response to a submitted search query, any number of search results which may each optionally include a snippet of a web document.

Macro identification engine 120 can determine, based on a search query of a user, whether the query relates to an action that may be associated with a macro. In some implementations, macro identification engine 120 may utilize NLP to determine whether the user has submitted a request to be provided with instructions to perform an action. For example, macro identification engine 120 may perform NLP on a submitted search query of "Show me how to silence my phone" and determine that the query matches an intent of "Provide instructions to perform an action" and a parameter of "silence phone." In some implementations, macro identification 120 may match queries to one or more rules to determine whether the query is related to providing a user instructions to complete an action. For example, macro identification engine 120 may identify that a submitted query matches a rule of "Show me how to <action>."

Macro identification engine 120 can provide information to macro suggestion engine 130 to determine whether a macro is available to provide to the user. For example, macro identification engine 120 can provide the NLP parameter that indicates an action of interest to the user. Also, for example, macro identification engine 120 can provide a parameter from a rule that indicates an action of interest to the user based on the search query submitted by the user. In some implementations, one or more APIs may request a macro from macro suggestion engine 130. For example, a web developer may intend to embed a macro in a website that performs a particular action. The web developer can access macro suggestion engine 130 and request that a macro be provided for the web developer to embed in a website, either as a graphical element or an API call to macro suggestion engine 130.

Figure 3:
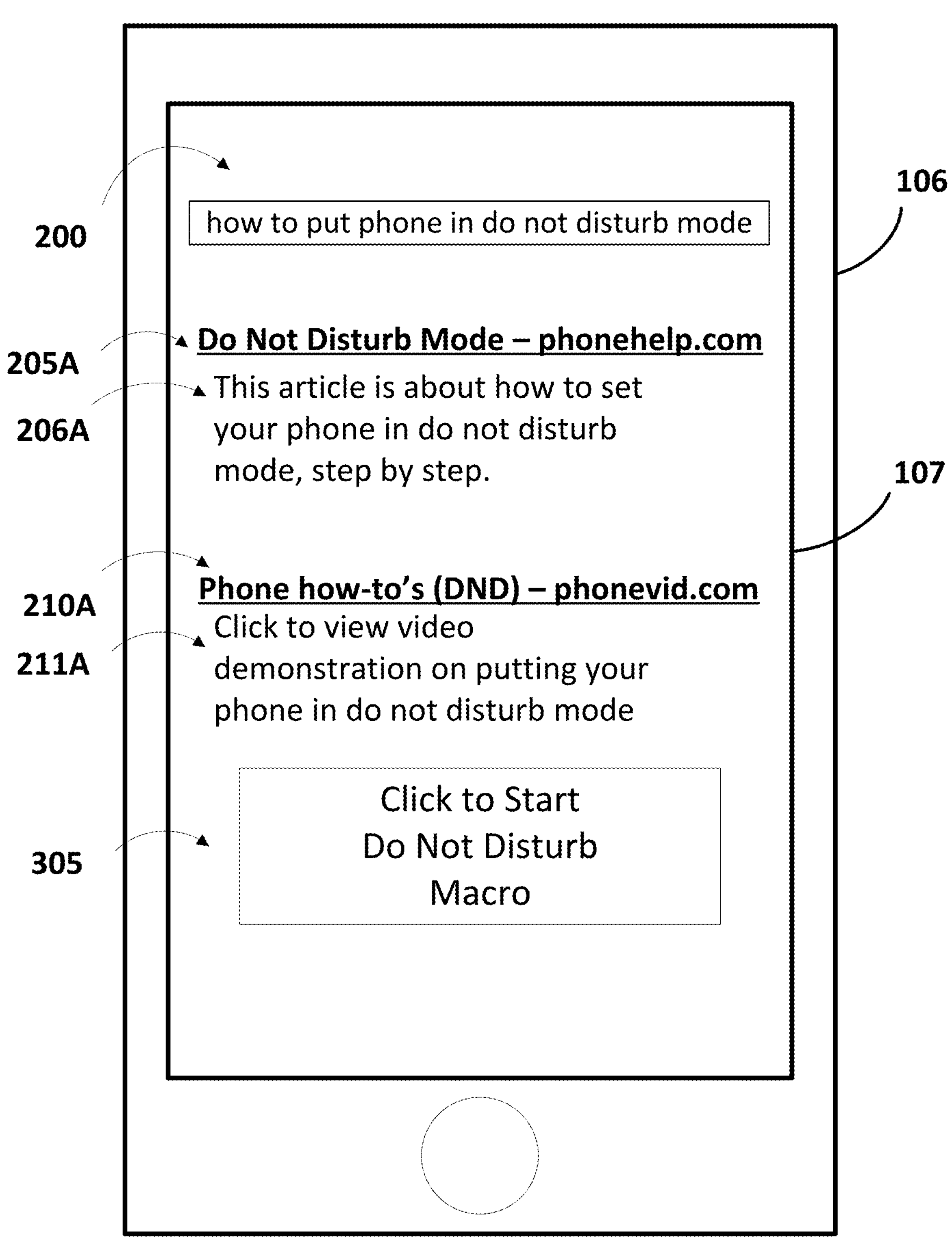
FIG. 3 depicts an example interface illustrating providing a macro with search results.

Once a macro has been identified by macro suggestion engine 130, the macro can be provided to the requester. In some implementations, the requester is a web page that the user has accessed. For example, a web page that is related to setting a phone to silence may include a graphical element that, when selected, initiates execution of the macro. Also, for example, search engine 110 may request the macro and a graphical element may be rendered with the search results as an actionable element (see, e.g., button 305 of FIG. 3).

Once a user indicates to initiate execution of a macro, macro execution engine 150 executes the macro. In some implementations, macro execution 150 identifies an application that is associated with the macro. The application can include an operating system and/or an application that is executing on the input device 106. Thus, for example, the macro may be associated with adjusting one or more settings and/or states of a mobile device. In that instance, the macro may be associated with the operating system of the mobile device. Also, for example, a macro may be associated with a particular version of an application and/or hardware of the device. For example, a first device may have a previous version of an operating system and a second device may have an updated version of the operating system. In that instance, the macro provided to the first device may be different than the macro provided to the second device because, for example, interface elements may not appear the same and/or may not be rendered in the same location.

Figure 4A:
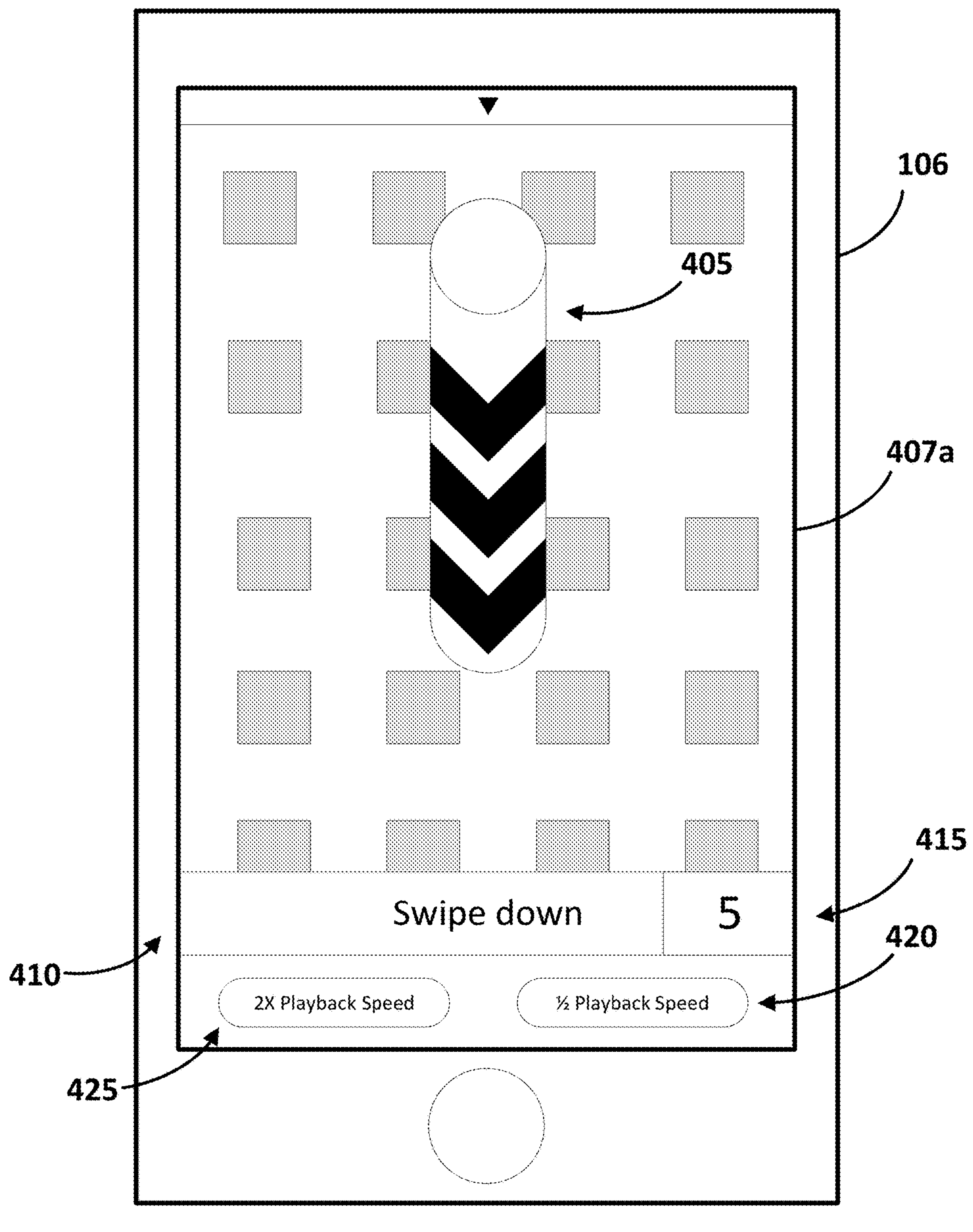
FIG. 4A, FIG. 4B, FIG. 4C, and FIG. 4D depict example interfaces illustrating macro actions.

Referring to FIG. 4A, an application interface 407*a* (in this instance, the home screen of an operating system) that is executing on input device 106 is illustrated. The interface 407*a* further includes macros elements that are provided by the macros execution engine 150. For example, the macros overlay includes a macro element 405, a textual element 410, a countdown element 415, and speed buttons 420 and 425. The macros interface overlays the home screen of input device 106. For example, the displayed application interface can include one or more icons to launch applications, one or more system displays (e.g., clock, widgets, battery life), and/or other elements that are rendered by the operating system.

As illustrated, the interface 407*a* includes a macro element 405. In some implementations, the macro element 405 can be static such that the macro is not animated and/or does not update to a different macro while being displayed. In some implementations, the macro element 405 can be dynamic such that it may, for example, change colors, appear to move, and/or the macro may exhibit other dynamic behavior to appear more prominent than other features being rendered.

The macro element 405 indicates that a user should make a swiping motion from the top of the screen towards the bottom of the screen. In some implementations, macro element 405 may be rendered by macro execution engine 150 and/or may be rendered by another application, such as an operating system and/or the application that is associated with the macro.

Still referring to FIG. 4A, interface 407*a* further includes a textual snippet 410 to indicate the action that is part of the macro. For example, as illustrated, the textual snippet 410 includes the text "swipe down" to indicate to the user what is meant by the macro element 405 and/or to give further indication of what is requested for the user to perform. In some implementations, textual snippet 410 may be absent and/or, in some implementations, macro element 405 may be absent and textual snippet 410 may be the only indication of the next action to perform to complete the macro. Further, in some implementations, textual snippet 410 may be interactive and, upon selecting the element, the user may be provided with additional information, toggle whether the element appears or not, performs the action, and/or further demonstrates the action.

Still referring to FIG. 4A, the interface 407*a* includes a countdown element 415. The countdown element 415 currently displays a "5" to indicate, for example, that five time units (e.g., seconds) are remaining before the macro execution engine 150 causes some event to occur. In some implementations, the event may be that the macro execution 150 automatically causes the action to occur, such as causing the application to perform as if the swiping motion were made by a user. In some implementations, the countdown element 415 may indicate that the macro execution engine 150 will cause the next action of the macro to be displayed in lieu of displaying macro element 405 (i.e., the macro will progress to the next step). In some implementations, countdown element 415 is optional and may not be present.

Referring still to FIG. 4A, the interface 407*a* further includes speed buttons 420 and 425. In some implementations, the user can adjust a playback speed for the macro utilizing selection elements similar to those illustrated in FIG. 4A. In some implementations, speed buttons 420 and 425 may not be present, additional buttons may be provided, and/or alternative speed buttons may be provided. If the user selects speed button 420, the playback speed of the macro may be increased such that the macro may update to a new display element at a faster pace (e.g., twice as fast as a "normal" speed). Conversely, if the user selects the speed button 420, the elements may appear on the interface more slowly (e.g., half as fast as "normal").

Figure 4B:
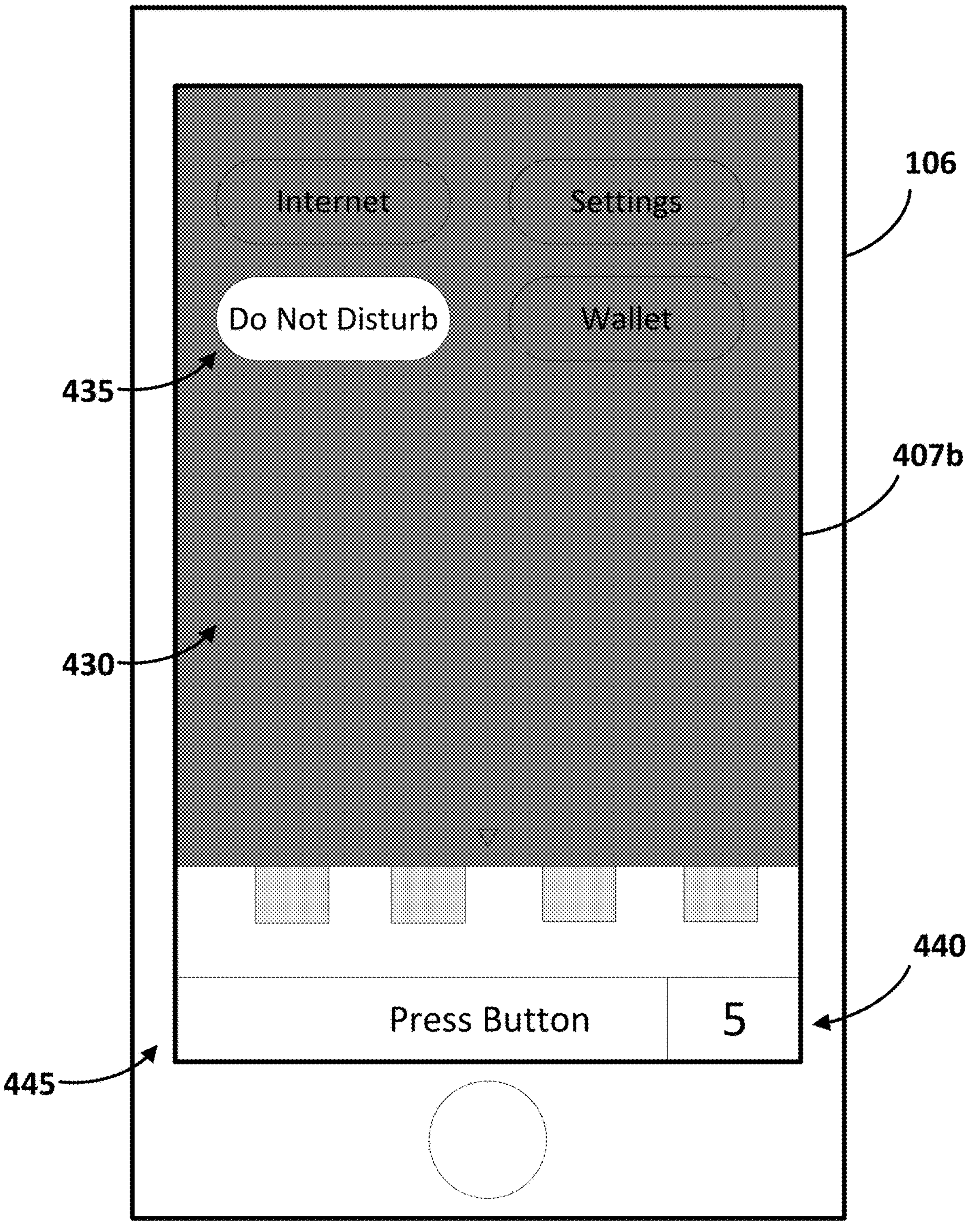

Referring to FIG. 4B, another application interface 407*b* (in this instance, a dropdown menu of an operating system) that is executing on input device 106 is illustrated. As illustrated, a macro is additionally executing that includes rendering a grayed area 430 over at least a portion of the screen. The area of the screen that includes button 435 is not grayed out like the rest of the area 430 around the button 435. Thus, the macro can indicate that the button 435 should be selected by the user to perform the next action of the macro.

Additionally, referring still to FIG. 4B, the interface 407*b* further includes a textual snippet 445 to indicate to the user that the action to be performed is "press button." As previously described with regards to textual snippet 410, textual snippet 445 is optional and may not be present as a feature of a macro. Further, countdown element 440 may share one or more characteristics with countdown element 415.

In some implementations, interface 407*b* of FIG. 4B may be rendered after the macro execution engine 150 renders interface 407*a* of FIG. 4A. For example, referring to FIG. 4A, the user may perform the action that is indicated by macro element 405 (i.e., "swiping the screen") which can cause the screen to update to display the interface 107 of FIG. 4B. When the screen updates, the next macro of the action can be displayed to indicate to the user to perform the next action. Also, for example, the updated interface 407*b* of FIG. 4B can be displayed after countdown element 415 indicates that "0" time is left to display the macro of FIG. 4A.

Figure 4C:
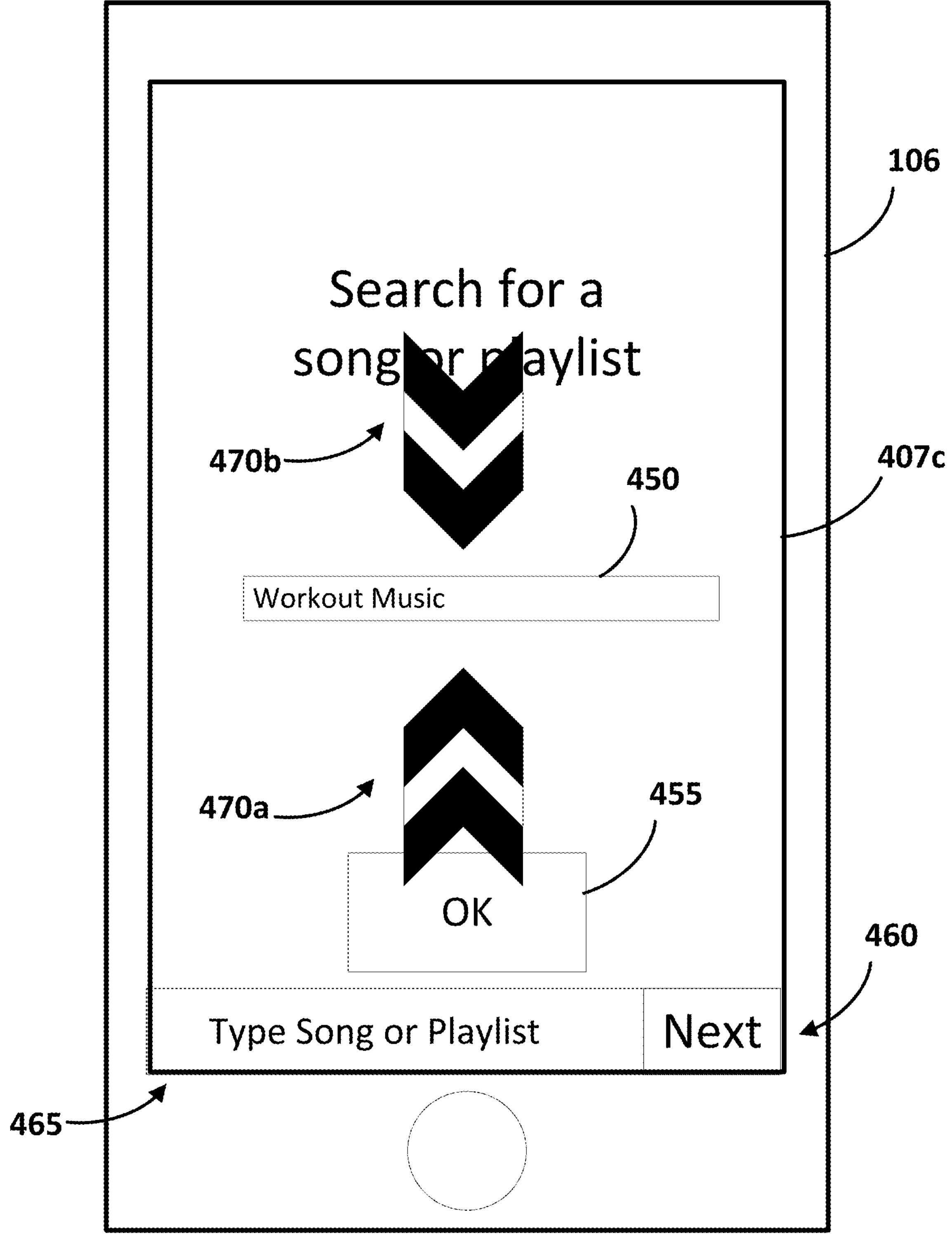

Referring to FIG. 4C, another interface 407*c* is illustrated with a macro indicating an action for a user to perform. As illustrated, the macro elements 470*a* and 470*b* are illustrated as two arrows that can indicate to the user that a text box requires an input. For example, the macro elements 470*a* and 470*b* are directed at text box 450. In some implementations, the macro elements 470*a* and 470*b* may be dynamic (e.g., move to point to text box 450), may be static, may be shaded a color that makes the arrows more identifiable (e.g., bright yellow and/or orange), and/or one or more features that attract the attention of the user.

As illustrated, text box 450 includes the text "Workout Music." In some implementations, a "Workout Music" playlist may be commonly provided by the user, such as a threshold number of times, a threshold percentage of the time, and/or other indications that a "Workout Playlist" may be of most interest to the user. The user may change the input of the text box 450, such as when the user would prefer to listen to a different playlist. In some implementations, the macro may include one or more elements to allow the user to select one or more inputs, such as a dropdown menu and/or one or more buttons that the user can interact with to provide input.

Further, as illustrated, interface 407*c* includes a textual element 465 that indicates to the user the action that is being indicated by the macro. In some implementations, textual box 465 may share one or more characteristics with textual snippet 445. Additionally, interface 407*c* includes a next button 460 that, when interacted with by the user, can cause the macro to progress to the next action of the macro. For example, if the user prefers to listen to "Workout Music," interacting with next button 460 may cause the input to text box 450 to be provided to the corresponding application. In some implementations, next button 460 may be replaced with a countdown timer that shares one or more characteristics with the countdown timers illustrated in FIGS. 4A and 4B.

In some implementations, an interface can include a back button that allows the user to be provided with the previous macro. For example, the next macro after the macro illustrated in FIG. 4C may be a macro to select the button 455, similar to the macro illustrated in FIG. 4B. When the user interacts with the next button 460, a macro may be provided that highlights the button 455 and the macro may further include a countdown, a back button, a next button, and/or one or more other elements. In the instance of a back button, selecting the button may cause macro execution engine 150 to cause the previous macro to be displayed.

In some implementations, the user may be provided with an option to allow the macro to perform an action or to wait and allow the user to perform the action. For example, referring to FIG. 4D, another interface 407*d* is provided that is an interface for a game application (or web page) with a gameboard 490 illustrated via the interface 407*d* and overlaid with additional macro elements. For example, the macro includes an arrow element 470, a suggested move 475, and buttons 480 and 485. In some implementations, suggested move 475 may be colored differently than the moves that have already been made. Further, arrow element 470 may share one or more characteristics with macro elements 470*a* and 470*b*.

In some implementations, the user may select an interactive element to launch a macro, as previously described. In this instance, the macro may determine, based on the state of the game 490, which move to make next. For example, one or more of the components of the macro execution engine 150 may be a gaming engine that can determine a next move based on artificial intelligence and/or a set of rules. In some implementations, one or more components of the macro system may consult an existing gaming engine that is a separate system, such as making an API call to a third-party gaming engine.

As illustrated, the macro is required to determine (or receive) information regarding the current state of the game 490 (i.e., where each move has been made). Thus, in some implementations, the macros system can additionally include a component that can identify the location of elements within the interface 107 and/or receive location/move information from the game application. For example, a component may utilize one or more screenshots of the application and determine the location of the moves from the screenshots (or screen recordings). The move identification components can utilize machine learning, pattern matching, and/or one or more other techniques to determine the location of the moves.

Figure 4D:
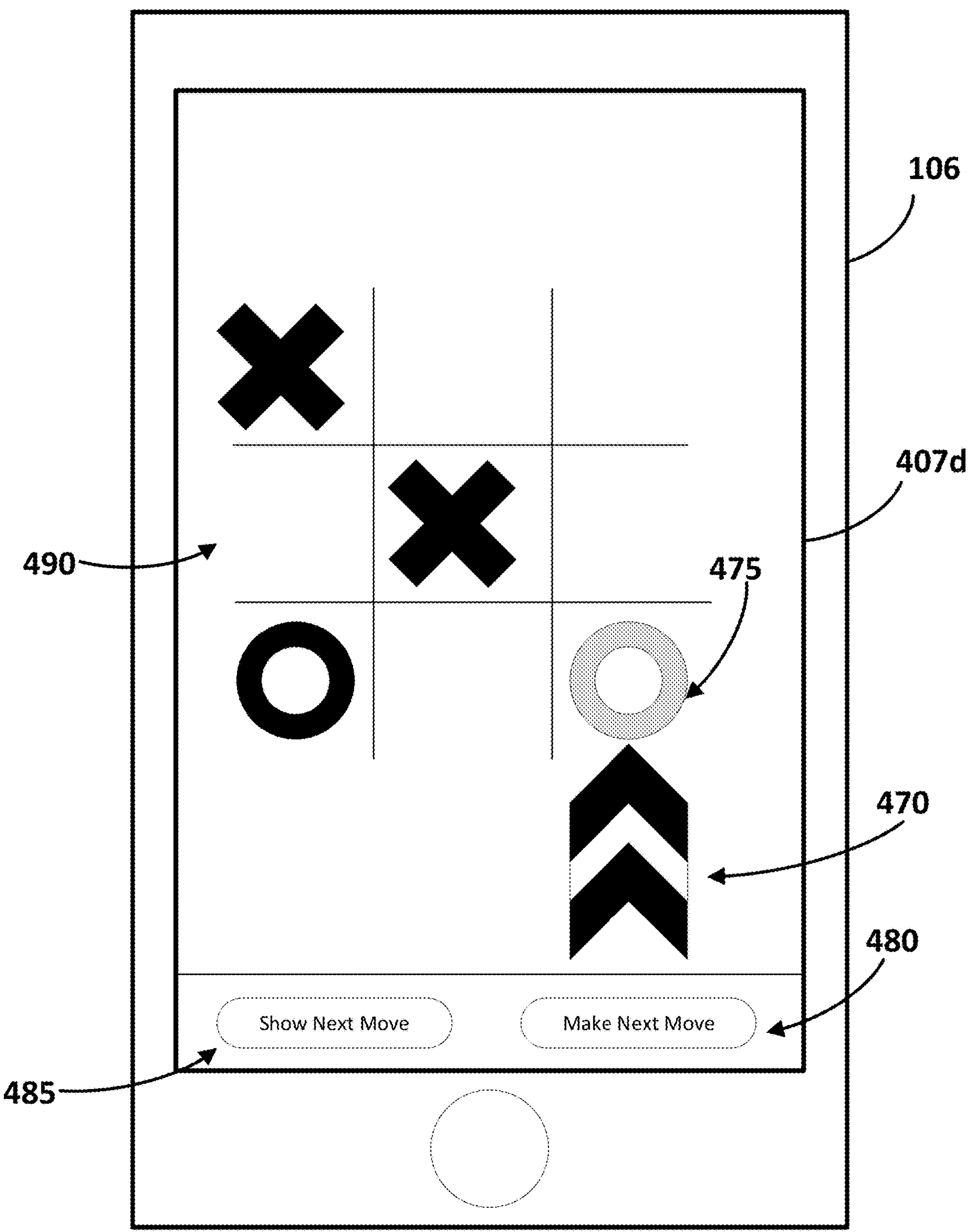

As previously mentioned, the macro of interface 407*d* includes buttons 480 and 485. In some implementations, the macro can be configured to automatically perform an action via the application of which it is overlaid. For example, if the user selects "Show Next Move," the macro may identify the locations of the previous moves, determine a next move, and display the suggested move 475 (along with, in some instances, additional elements), as illustrated in FIG. 4D. In some implementations, a button 480 may prompt the macro system to make the move in lieu of the user performing the action. For example, if the user selects "Make Next Move," the macro system may automatically perform the action. As described herein, any macro illustrated and/or discussed may perform similar actions. In some implementations, the user may be informed of the actions taken by the macro (e.g., a text area that indicates "I pressed this button" and/or "I made the move of O to the lower right").

Figure 5A:
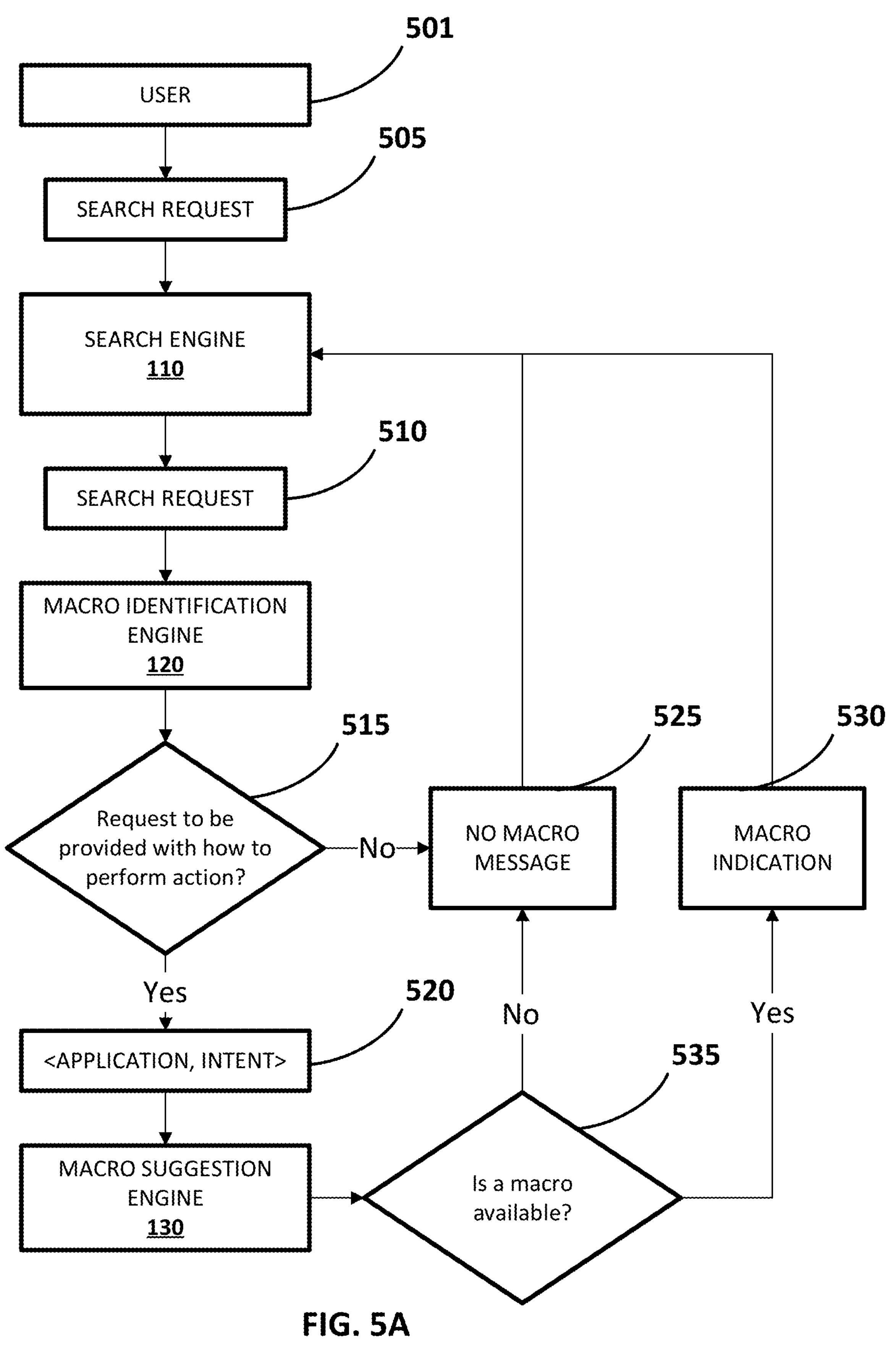
FIG. 5A depicts a flowchart illustrating providing a macro to a web browser.

Referring to FIG. 5A, a flowchart is provided that illustrates the information flow to provide a macro element when a request is received via a user search for how to perform an action. Although the flowchart illustrates a search engine 110, a user that selects another indication of a macro (e.g., selecting an icon that is displayed on an interface, speaking a phrase to an automated assistant that is translated into a request) can result in a similar flow of information. Thus, implementations described herein are similar for web searches (as illustrated in FIGS. 4A and 4B) and macros that are invoked when an application is executing (as illustrated in FIGS. 4C and 4D).

As illustrated, a user 501 can submit a search request 505 to a search engine 110. In some implementations, search engine 505 can determine, based on the search request 505, that a macro may be available to fulfill the search request. In some implementations (and as illustrated, the search request may be provided to macro identification engine 120 for further analysis. In either instance, a component performs NLU on the search request to determine the meaning of the request. Also, for example, the user may submit a search request via an utterance to an automatic assistant, which can perform ASR on the audio data generated from the utterance, whereby additional NLU can be performed by the automated assistant and a web search conducted. Additionally or alternatively, the macro identification engine may be a component of the automated assistant client and may determine whether a macro may fulfill the user request before providing an indication of the request to one or more other components.

As illustrated, search engine 110 provides macro identification engine 120 with the search request. In response, macro identification engine 120 can determine, at decision 515, whether the request is to provide the user with information on how to perform an action. If not, the macro identification engine 120 can provide a notification 525 to search engine 110 that no macro is available. Thus, the search engine can proceed with displaying search results without displaying a macro suggestion, as illustrated by button 305 FIG. 3. If the request is to be provided with information related to performing an action, an indication of the type of macro that is being requested 520 is provided to macro suggestion engine 130. Macro suggestion engine 130 then can determine whether a macro exists (at decision 535) and, if so, provide a macro indication, such as button 305 and/or a notification to render a button 305, to search engine 110.

Figure 2B:
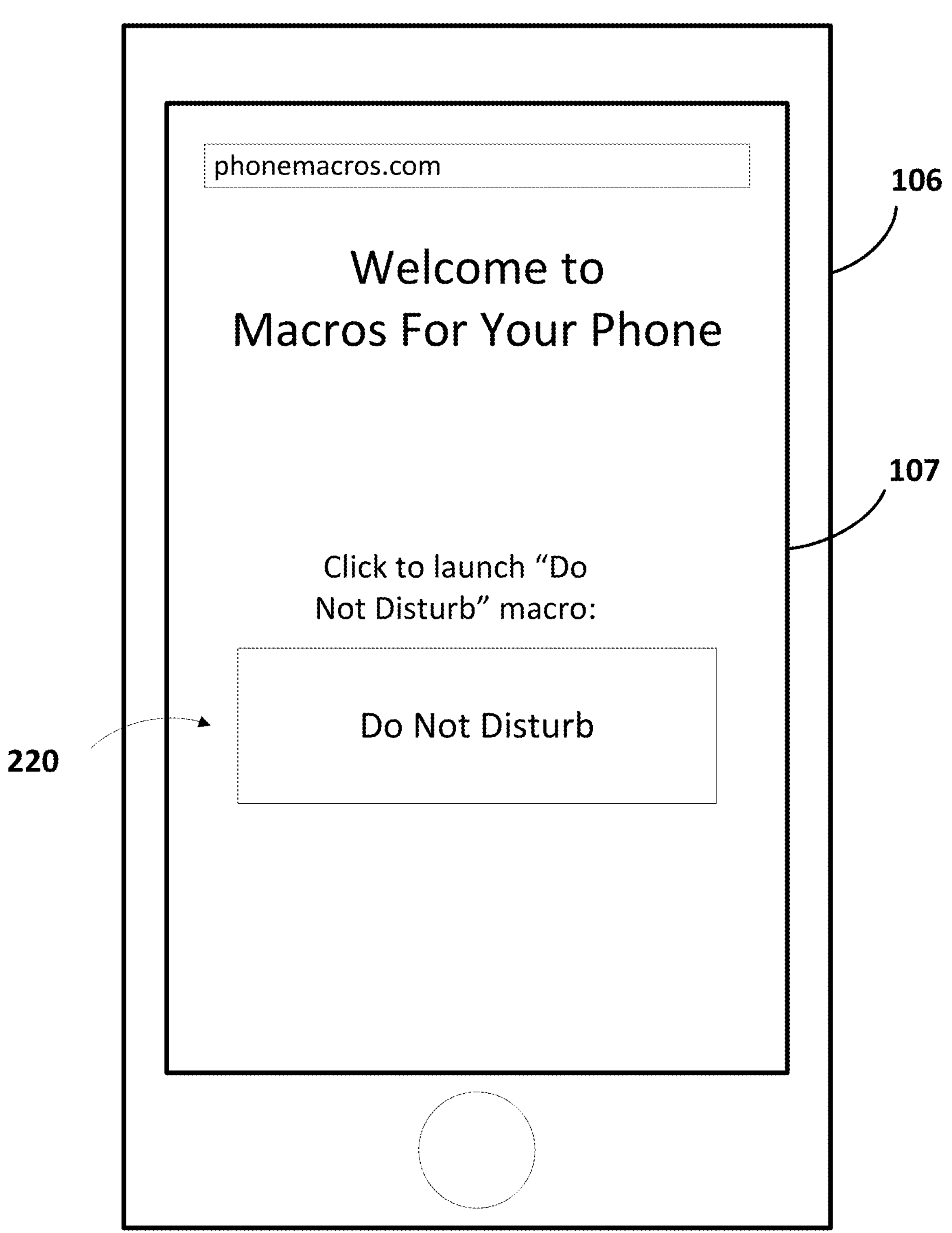

Although depicted as providing a macro indication to a search engine, providing a macro indication to an application (or a web page) follows a similar set of steps. For example, a developer of a website can request, via an API, to be provided with a macro, if one exists, that performs a specific task. If the macro exists, it can be provided by the macro suggestion engine 130. Also, for example, a website can include a request to be provided with a macro indication and, if one exists, the indication can be provided to the website for rendering, as illustrated in FIG. 2B.

In some implementations, past user interactions with an application and/or past requests by the user to initiate a macro can be utilized to adjust the performance of a macro. For example, if a user is requesting to be provided with information regarding performing an action via an application for the first time, the macro can be provided in a manner that allows the user to more slowly be provided with the actions to perform. Similarly, if the user has requested how to perform an action multiple times, the user may be provided with the macro such that one or more of the steps are provided more quickly than a user that has requested the macro fewer times.

Figure 5B:
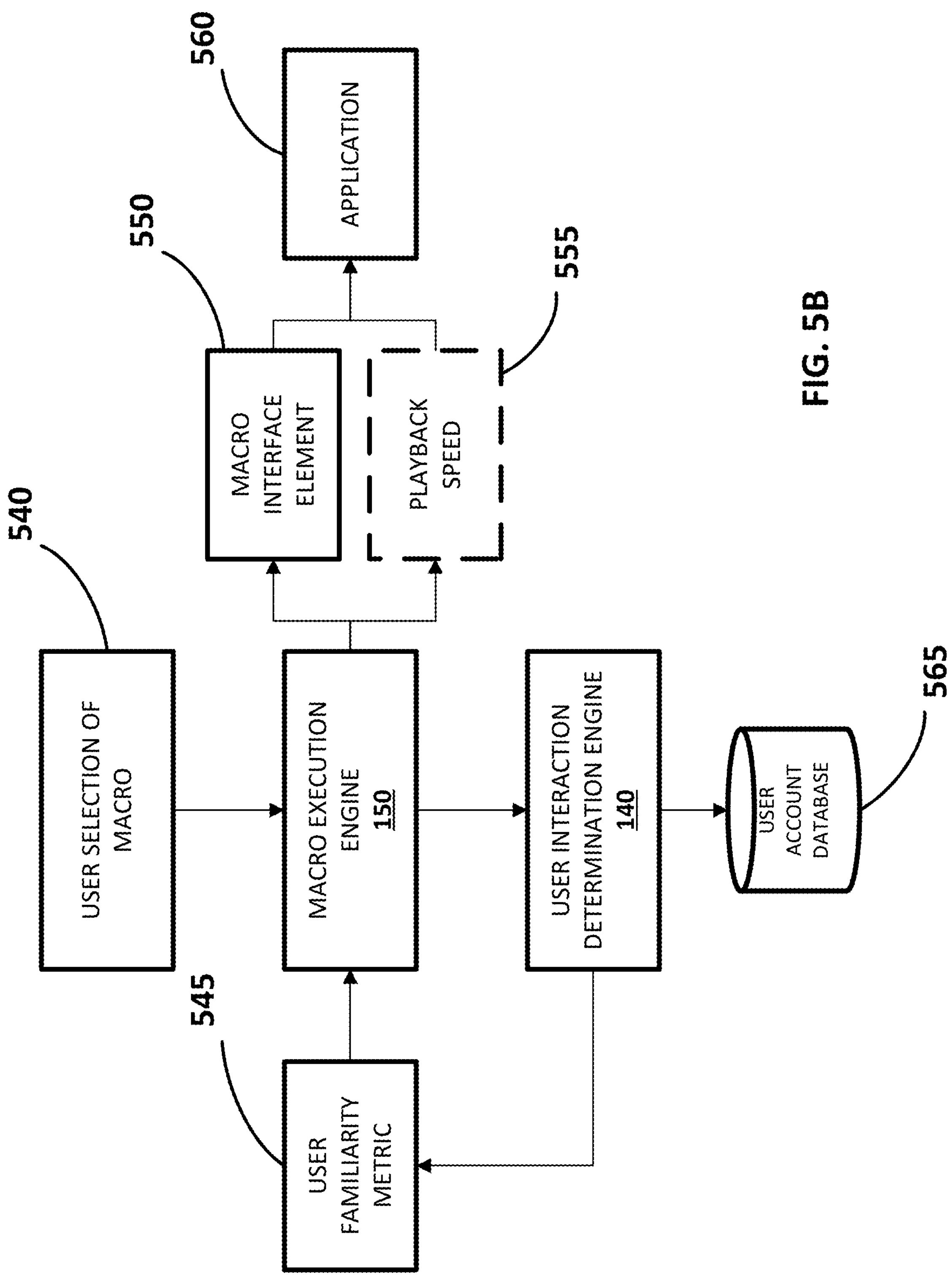
FIG. 5B depicts a flowchart illustrating using a user familiarity metric to determine one or more characteristics of a macro.

User interaction determination engine 140 can determine, based on identifying past interactions of the user, a user familiarity metric that is indicative of the familiarity of the user with a particular action. Referring to FIG. 5B, in some implementations, user interaction determination engine 140 can identify user information stored in user account database 565. For example, user account database 565 can include information related to past requests provided to a search engine, previous instances of the user utilizing a macro, and/or other user information that is related to the user being provided with instructions to perform an action and/or access an application.

Based on the previous interactions of the user, user interaction determination engine 140 can determine a user familiarity metric that is indicative of a user's familiarity with a particular action and/or a particular application. For example, a user may have accessed a macro one time to be provided with instructions to perform an action. Based on being provided the macro once previously, the macro may be provided to the user (when the user requests the macro a second time) with one or more elements rendered differently than the previous time. As the user performs the action repeatedly and/or requests the macro repeatedly, the user familiarity metric may change to indicate more familiarity with the action. Thus, as the user requests the macro more times, the macro can be rendered with steps provided more quickly and/or with one or more elements changed to allow the user to more quickly perform the action.

In some implementations, a playback speed of a macro can be determined based on the user familiarity metric. The playback speed can be utilized to determine how long to wait between causing a first macro element to be rendered and causing a second macro element to be rendered. For example, referring to FIG. 4A, the countdown timer 415 may count down the time that element 405 before the macro execution engine 150 renders the next macro (e.g., the macro depicted by FIG. 4B. For a user that has requested the macro for a first time, the playback speed may be slower than a user that has accessed the macro multiple times. As a result countdown times 415 may count down more slowly for the first user than the second user based on the familiarity metric for the first user is less than the familiarity metric for the second user.

Additionally or alternatively, as previously mentioned, the user can adjust the playback speed utilizing buttons 420 and 425. By selecting one of the buttons, the playback speed can be adjusted. However, the base playback speed (e.g., "1× playback") can be determined based on the user familiarity metric, as previously described. Thus, for example, a user that has accessed the macro a given number of times may be provided with each macro for 10 seconds before moving on to the next macro element. By selecting button 425, the macros may be provided to the user at a playback speed of a macro element every five seconds. Similarly, the same user may be provided with a macro element every twenty seconds if button 420 is selected.

In some implementations, in lieu of being provided with a countdown timer and automatically providing the next macro in a sequence, the user may be provided with a "next" button, as illustrated in FIG. 4C. For example, a user that is accessing a macro for the first time may be provided with a "next" button that does not advance the macro to the next step until the user selects the button. As the user accesses the macro more times, the macro may be rendered with the countdown timer, and with additional instances of the user accessing the macro, the playback speed can be increased.

In some implementations, a macro can execute without displaying one or more elements via the interface 107. For example, a user may perform a search via a search function of a mobile device to perform an action (e.g., "set phone to do not disturb"), and a macro may execute without displaying the steps to the user. Also, for example, a user may provide the same request to a web search engine and be provided with the same macro, but with one or more steps displayed, as described herein. Thus, depending on the manner in which the user submitted a search request, the same macro can be presented differently. Similarly, depending on how a user submitted a request (e.g., mobile device search, web search, selecting a URL), the same macro may be executed with varying execution speeds. For example, a search of "DND" may automatically execute the macro, but a search of "DND" via a web page may display the macro steps and do so at an execution speed that is slower than if the user selected a URL and selected the macro from a web page. In some implementations, the text of a search query can affect the execution of the macro. For example, a user that types "how do I set my phone to do not disturb" may be provided with steps more slowly than a user that types a search of "DND" or "do not disturb."

Figure 6A:
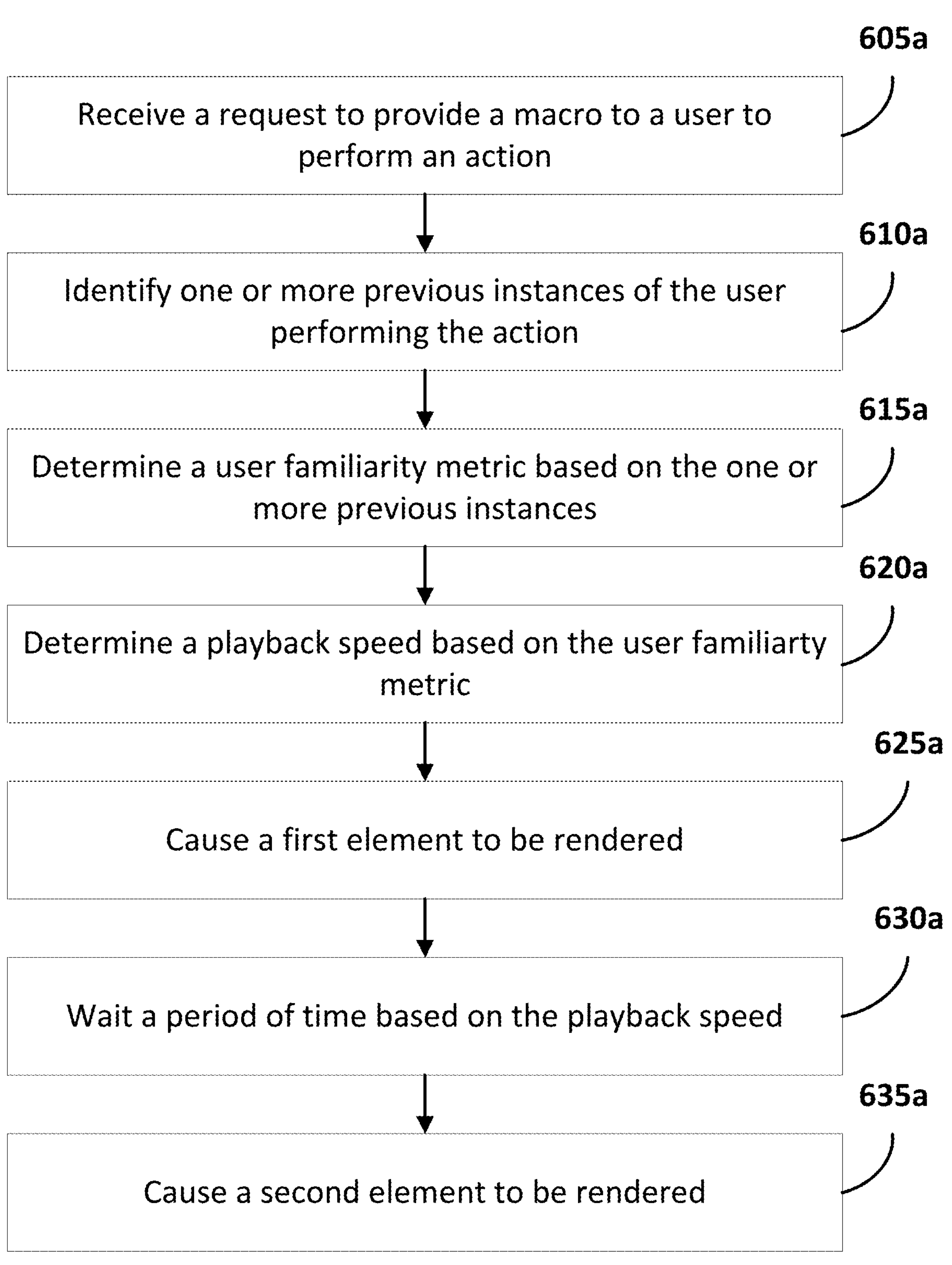
FIG. 6A and FIG. 6B depict a flowchart illustrating an example method according to various implementations disclosed herein.

FIG. 6A depicts a flowchart illustrating an example method of providing a user with a macro that is displayed, at least in part, based on user familiarity with an application. For convenience, the operations of the method are described with reference to a system that performs the operations, such as the system illustrated in FIG. 1. This system of the method includes one or more processors and/or other component(s) of a client device. Moreover, while operations of the method are shown in a particular order, this is not meant to be limiting. One or more operations may be reordered, omitted, or added.

At step 605*a*, a request to provide a macro to a user to perform an action is received. The request may originate from a search engine that has received a request from a user that indicates that the user is searching for instructions to perform an action via an application (and/or the operating system of a mobile device). For example, the user may search for "how to put phone in do not disturb mode," and a search engine, such as search engine 110, can determine that the user may be assisted by a macro. In response, search engine 110 may send a request to macro identification engine 120 to determine whether a macro is available, and further macro suggestion engine 130 can provide an indication of a macro for the search engine to integrate into search results. Also, for example, the request can be an API call from a website that includes, for example, instructions for performing an action. Also, for example, one or more applications executing on a mobile device may include a "macro" function that allows the user to be provided with known macros (e.g., a "macros" button on a home screen).

At step 610*a*, one or more previous instances of the user performing the action are identified. The one or more previous instances can include, for example, previous instances of user requests to be provided with instructions to perform the action, previous instances of the user being provided with a macro, one or more instances of the user attempting to perform the action without utilizing a macro, and/or other indications of the user experience with performing the action. The user interactions can be determined by a component that shares one or more characteristics with user interaction determination engine 140.

At step 615*a*, a user familiarity metric is determined based on the one or more previous instances. The user familiarity metric is an indication of how familiar a user is with performing an action. In some implementations, the user familiarity metric is determined based on one or more additional factors, including the terms that were provided by a user in a search request, the origin of requests to be provided a macro, and/or one or more other indications that indicate user familiarity with a macro and/or an application.

At step 620*a*, a playback speed is determined based on the user familiarity metric. The playback speed determines the period of time that elapses between when a first macro element is displayed to the user and when the next macro element is displayed to the user. For example, a playback speed of 5 seconds may be determined for a user with some familiarity with a macro and/or action (i.e., has a first familiarity metric that is indicative of moderate user familiarity). A second playback speed of 10 seconds may be determined for a user that has less familiarity with the macro and/or the action (i.e., has a second familiarity metric that is less indicative of user familiarity than the first user familiarity metric). Thus, for the same macro, the playback speed can vary depending on the user familiarity metric of the user. In some implementations, when a user is not familiar at all or minimally with the macro and/or action, the playback speed may be determined to be inapplicable and, in lieu of automatically providing the next macro element, the user may select an option to progress to the next element (e.g., a "next" button provided with the macro).

At step 625*a*, a first element is caused to be rendered. The element may be rendered by a component that shares one or more characteristics with macro execution engine 150. For example, various macro elements are displayed in FIGS. 4A-4D and described herein in greater detail.

At step 630*a*, one or more components wait a period of time based on the playback speed. As previously described, the playback speed can be determined based on the user familiarity with the macro and/or action. In some implementations, the macro can include a countdown timer to indicate to the user how much time is left before the period of time expires. In some implementations, once the period of time expires, at step 635*a*, a second element is caused to be rendered.

Figure 6B:
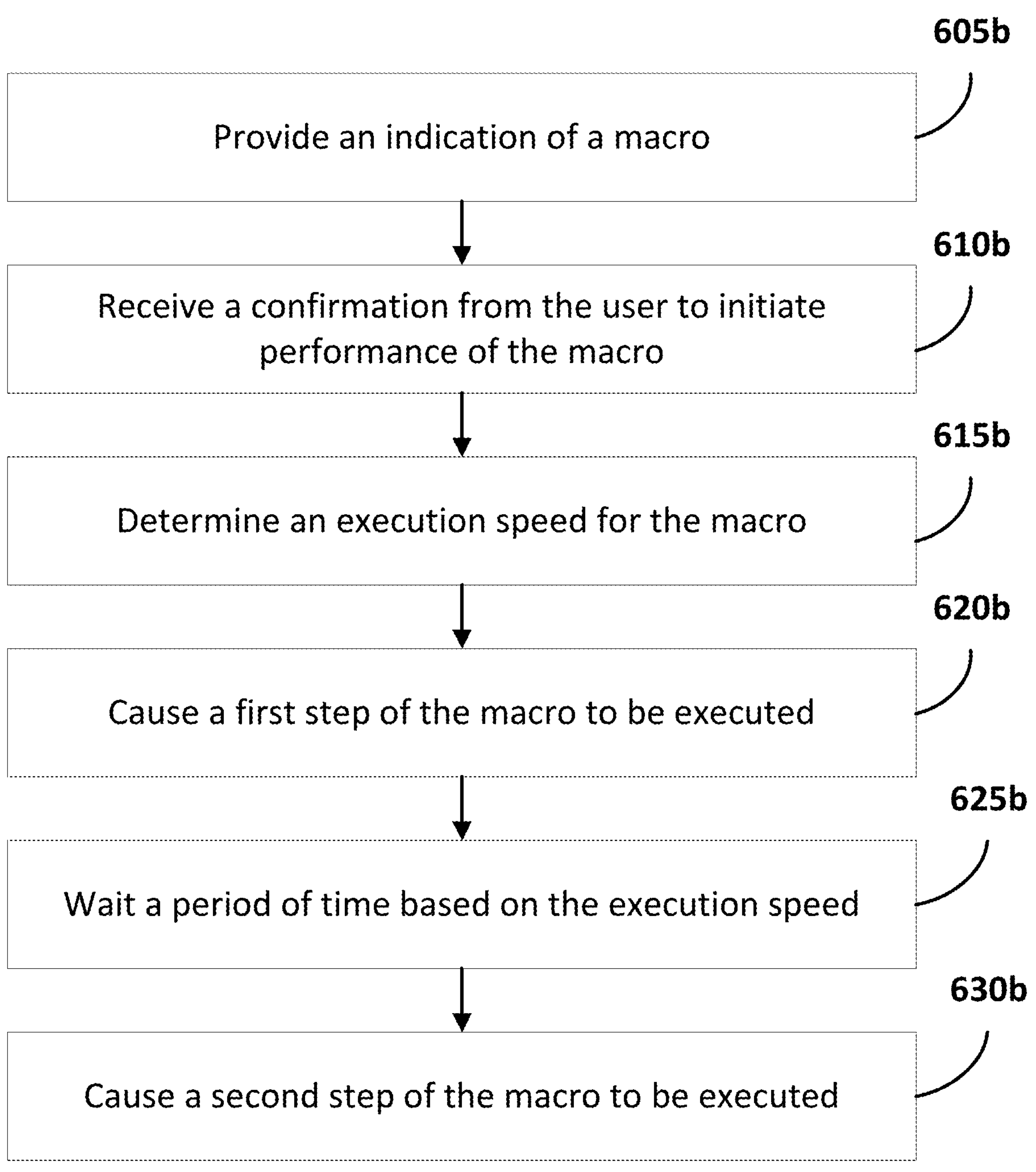

FIG. 6B depicts another flowchart illustrating an example method of providing a user with a macro that is displayed, at least in part, based on user familiarity with an application. For convenience, the operations of the method are described with reference to a system that performs the operations, such as the system illustrated in FIG. 1. This system of the method includes one or more processors and/or other component(s) of a client device. Moreover, while operations of the method are shown in a particular order, this is not meant to be limiting. One or more operations may be reordered, omitted, or added.

At step 605*b*, an indication of a macro is provided. In some instances, the indication may be provided to a search engine to display an option to the user to initiate a macro. In some instances, the indication can be provided to a web browser to display via a web page. Also, in some instances, an application may be provided with an indication of a macro. In some implementations, the indication may be requested by the corresponding application and/or entity. Thus, for example, a search engine may request to be provided with a macro that can fulfill a search request of the user. At step 610*b*, the user confirms the initiation of the macro.

At step 615*b*, an execution speed is determined for the macro. In some implementations, the execution speed can be determined based on user familiarity with the macro and/or action (see, e.g., steps 610*a*-620*a*). In some implementations, the entity that requested the macro (or one or more inputs from the user to the requesting entity) may be utilized to determine an execution speed. For example, one or more of the search terms that a user provided to a search engine can be utilized to determine an execution speed, such as a different speed if the user submits "DND mode" versus "How to set my phone in do not disturb mode."

At step 620*b*, a first step of the macro is executed. This step may share one or more characteristics with step 625*a* of FIG. 6A. In some implementations, the step may include displaying one or more macro elements. In other implementations, the step may include not displaying an element, but waiting a period of time before going to a next step and/or before providing the macro element. At step 625*b*, a period of time elapses, as previously described in step 630*a* of FIG. 6A. At step 630*b*, a second step is caused to be executed in a similar manner to the first step.

Figure 7:
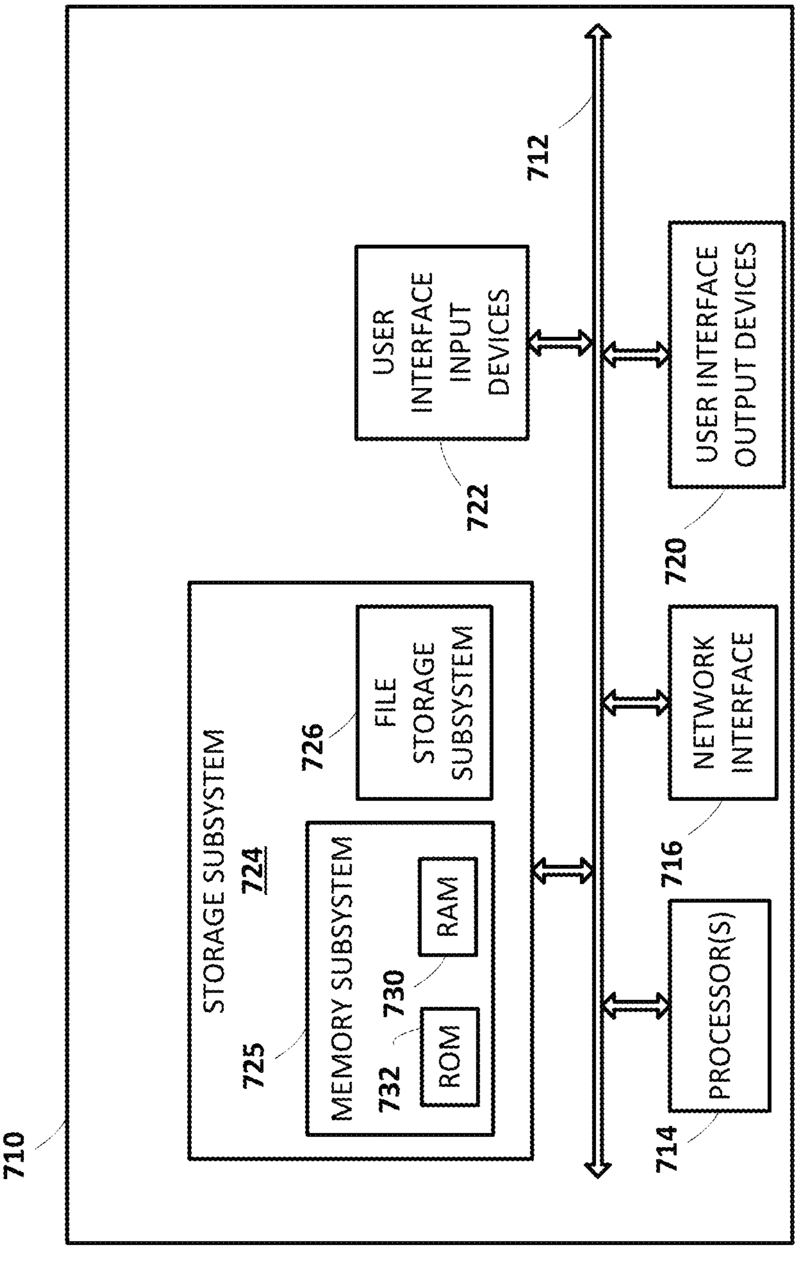
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 3, and/or to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors is provided and includes receiving a request from a user to utilize a macro to perform an action, wherein the macro automatically instructs the user to perform the action via one or more interface elements overlaying an application interface of an application, and wherein the macro includes at least a first step and a second step, identifying one or more previous instances of the user performing the action, determining, based on the one or more previous instances, a user familiarity metric, wherein the user familiarity metric indicates user experience with performing the action, determining, based on the user familiarity metric, a playback speed for the macro, causing a first interface element of the interface elements to be rendered, wherein the first interface element is associated with the first step, and waiting a period of time, wherein the period of time is determined based on the playback speed. In response to waiting the period of time, the method further includes causing a second interface element of the interface elements to be rendered, wherein the second interface element is associated with the second step.

These and other implementations of the technology disclosed herein can include one or more of the following features.

In some implementations, the application is an operating system of a computing device.

In some implementations, the method further includes rendering, while waiting the period of time, a countdown element that indicates a remaining time, of the period of time, remaining before rendering the second interface element.

In some implementations, the user interactions include one or more instances of the user requesting the macro.

In some implementations, the method further includes receiving a playback speed request from the user to adjust the playback speed, determining, based on the playback speed request, an adjusted playback speed, and adjusting the period of time based on the adjusted playback speed.

In some implementations, one of the interface elements indicates a location on the interface where the user is required to perform a gesture to complete one of the steps. In some of those implementations, the gesture is the user swiping the interface. In other of those implementations, the gesture is the user selecting a button element.

In some implementations, an interface element of the interface elements is a textual element that indicates to the user how to complete a corresponding step.

In some implementations, another method implemented by one or more processors is provided and includes providing an indication of a macro to perform an action, wherein the macro automatically performs the action without additional input from a user and receiving a confirmation from the user to initiate performance by the macro. In response to receiving the confirmation, the method further includes determining an execution speed for the macro, causing a first step of the macro to be executed, and waiting a period of time, wherein the period of time is determined based on the execution speed. In response to waiting the period of time, the method further includes causing a second step of the macro to be executed.

These and other implementations of the technology disclosed herein can include one or more of the following features.

In some implementations, the execution speed is provided by the user.

In some implementations, the execution speed is determined based on a type associated with the confirmation.

In some implementations, the type is a URL of a document that was accessed by the user.

In some implementations, the type is a search result from a web browser.

In some implementations, the type is a search result from a mobile device that is executing the macro.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, the method comprising:

receiving a request from a user to utilize a macro to perform an action, wherein the macro automatically instructs the user to perform the action via one or more interface elements overlaying an application interface of an application, and wherein the macro includes a plurality of steps;

identifying one or more previous instances of the user utilizing the macro in performing the action, wherein utilizing the macro in performing the action includes utilizing the plurality of steps of the macro;

determining, based on the one or more previous instances of the user utilizing the macro in performing the action, including utilizing the plurality of steps of the macro, a user familiarity metric, wherein the user familiarity metric indicates user experience with performing the action;

determining, based on the user familiarity metric, a playback speed for the macro, wherein determining the playback speed for the macro based on the user familiarity metric comprises:

when the user familiarity metric indicates a first measure of user experience with performing the action, determining a first playback speed; and when the user familiarity metric indicates a second measure of user experience with performing the action, determining a second playback speed, wherein the first playback speed is faster than the second playback speed when the first measure of user experience indicates more user experience with performing the action than the second measure of user experience;

causing a first interface element of the one or more interface elements to be rendered, wherein the first interface element is associated with a first step of the plurality of steps;

waiting a period of time, wherein the period of time is determined based on the playback speed; and in response to waiting the period of time:

causing a second interface element of the one or more interface elements to be rendered, wherein the second interface element is associated with a second step of the plurality of steps.

2. The method of claim 1, wherein the application is an operating system of a computing device.

3. The method of claim 1, further comprising:
rendering, while waiting the period of time, a countdown element that indicates a remaining time, of the period of time, remaining before rendering the second interface element.

4. The method of claim 1, wherein the one or more previous instances include one or more instances of the user requesting the macro.

5. The method of claim 1, further comprising:
receiving a playback speed request from the user to adjust the playback speed;
determining, based on the playback speed request, an adjusted playback speed; and
adjusting the period of time based on the adjusted playback speed.

6. The method of claim 1, wherein one of the interface elements indicates a location on the application interface where the user is required to perform a gesture to complete one of the steps.

7. The method of claim 6, wherein the gesture is the user swiping the application interface.

8. The method of claim 6, wherein the gesture is the user selecting a button element.

9. The method of claim 1, wherein an interface element of the interface elements is a textual element that indicates to the user how to complete a corresponding step.

10. A system, comprising:
memory storing instructions; and
one or more processors operable to execute the instructions to:
receive a request from a user to utilize a macro to perform an action, wherein the macro automatically instructs the user to perform the action via one or more interface elements overlaying an application interface of an application, and wherein the macro includes a plurality of steps;
identify one or more previous instances of the user utilizing the macro in performing the action, wherein utilizing the macro in performing the action includes utilizing the plurality of steps of the macro;
determine, based on the one or more previous instances of the user utilizing the macro in performing the action, including utilizing the plurality of steps of the macro, a user familiarity metric, wherein the user familiarity metric indicates user experience with performing the action;
determine, based on the user familiarity metric, a playback speed for the macro, wherein in determining the playback speed for the macro based on the user familiarity metric, one or more of the processors are to:
when the user familiarity metric indicates a first measure of user experience with performing the action, determine a first playback speed; and
when the user familiarity metric indicates a second measure of user experience with performing the action, determine a second playback speed, wherein the first playback speed is faster than the second playback speed when the first measure of user experience indicates more user experience with performing the action than the second measure of user experience;
cause a first interface element of the one or more interface elements to be rendered, wherein the first interface element is associated with a first step of the plurality of steps;
wait a period of time, wherein the period of time is determined based on the playback speed; and
in response to waiting the period of time:
cause a second interface element of the one or more interface elements to be rendered, wherein the second interface element is associated with a second step of the plurality of steps.

11. The system of claim 10, wherein the application is an operating system.

12. The system of claim 10, wherein one or more of the processors, in executing the instructions, are further to:
render, while waiting the period of time, a countdown element that indicates a remaining time, of the period of time, remaining before rendering the second interface element.

13. The system of claim 12, wherein the one or more previous instances include one or more instances of the user requesting the macro.

14. The system of claim 10, wherein one or more of the processors, in executing the instructions, are further to:
receive a playback speed request from the user to adjust the playback speed;
determine, based on the playback speed request, an adjusted playback speed; and
adjust the period of time based on the adjusted playback speed.

15. The system of claim 10, wherein one of the interface elements indicates a location on the application interface where the user is required to perform a gesture to complete one of the steps.

16. The system of claim 15, wherein the gesture is the user swiping the application interface.

17. The system of claim 15, wherein the gesture is the user selecting a button element.

18. The system of claim 10, wherein an interface element of the interface elements is a textual element that indicates to the user how to complete a corresponding step.

* * * * *